UNITED STATES PATENT OFFICE.

MAX HENRY ISLER, OF MANNHEIM, GERMANY, ASSIGNOR TO BADISCHE ANILIN & SODA FABRIK, OF LUDWIGSHAFEN-ON-THE-RHINE, GERMANY, A CORPORATION.

COLORING-MATTERS OF THE ANTHRAQUINONE SERIES.

1,062,975.  Specification of Letters Patent.  Patented May 27, 1913.

No Drawing.  Application filed April 20, 1912.  Serial No. 692,043.

*To all whom it may concern:*

Be it known that I, MAX HENRY ISLER, citizen of the Swiss Republic, residing at Mannheim, Germany, have invented new and useful Improvements in Coloring-Matters of the Anthraquinone Series, of which the following is a specification.

This invention consists in the manufacture and production of new condensation products of the anthraquinone series, which products can be used as vat coloring matters. To obtain these products I condense omega-dichlor-2-methyl-anthraquin ne or anthraquinone-2-aldehyde, or a halogen derivative of either of these bodies, with ortho-diamino-anthraquinones; 1.2-diamino-anthraquinone and 2.3-diamino-anthraquinone can be used for the purpose. The 1.2-diamino-anthraquinone can be obtained either by the reduction of 1-amino-2-nitro-anthraquinone or by splitting off the sulfo group from 1.2-diamino-anthraquinone-3-sulfoacid, as has hitherto been practised, or the 1.2-diamino-anthraquinone can be obtained by heating 1-amino-anthraquinone-2-sulfoacid with ammonia under pressure. For the purposes of this invention an anthraquinone-2-aldehyde body is to be regarded as equivalent to the corresponding omega-dihalogen-2-methyl-anthraquinone body.

The condensation to the new products is effected by heating the two components together, preferably in a suitable solvent or suspension agent. The products obtained vary slightly according to the conditions applying during the reaction, thus products can be obtained which appear to stand in a relation to one another similar to that in which the imidazole stands to its dihydro compound. The product obtained by the condensation of 1.2-diamino-anthraquinone and anthraquinone-2-aldehyde, as hereinafter set forth in Example 4, gives, upon analysis, figures which correspond to the formula

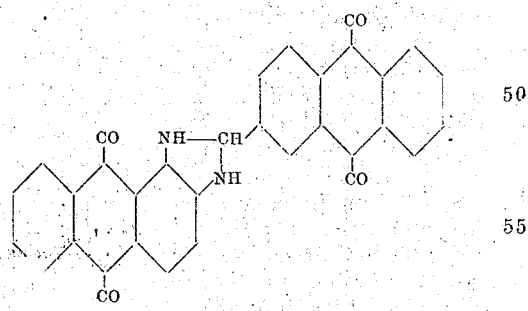

but obviously the percentage composition as determined by analysis cannot give certain information as to the composition of the products and I do not bind myself to this constitution.

The following are examples of how my invention can be carried into practical effect, but the invention is not confined to these examples. The parts are by weight.

Example 1: Mix together 24 parts of 1.2-diamino-anthraquinone, 30 parts of omega-dichlor-2-methyl-anthraquinone, 500 parts of nitrobenzene, 15 parts of calcined soda and 1.2 part of copper oxid. Boil the mixture until a further increase in the formation of coloring matter can no longer be observed. Collect the coloring matter by filtration, which is preferably effected at about 60° C., wash with nitrobenzene and subsequently with alcohol. If desired, purify the product by boiling with acetic acid, which removes some of the impurities, if any be present, and re-crystallize from quinolin. The product purified in this way does not melt at 330° C. and is almost, or entirely, insoluble in most of the usual solvents, though it can be re-crystallized from boiling quinolin. It dissolves in concentrated sulfuric acid, giving a solution of a yellow-orange color. In an alkaline hydrosulfite solution it gives a yellow-red vat which dyes cotton giving, after washing, clear yellow shades.

Example 2: Treat 24 parts of 2.3-diamino-anthraquinone and 30 parts of omega-dichlor-2-methyl-anthraquinone as described in the foregoing example in order to bring about their condensation. Small crystals of the new coloring matter separate out from the hot reaction liquid. Isolate the new coloring matter as described in the foregoing example. It is exceedingly difficultly soluble in the ordinary solvents, is insoluble in water, caustic soda, and dilute mineral acid, and soluble in concentrated sulfuric acid giving a yellow solution. In alkaline sodium hydrosulfite solution a brown-red vat is obtained which dyes cotton brown-red, but, upon washing and exposure to the air, the color becomes a clear lemon yellow.

Example 3: Mix 10 parts of 1.2-diamino-anthraquinone, 20 parts of anthraquinone-2-aldehyde and 300 parts of nitrobenzene (or an equal weight of naphthalene) and heat the mixture at the boiling point for some hours. Isolate as described in the foregoing Example 1. This product also dyes from the alkaline hydrosulfite vat giving yellow shades on cotton. It gives a yellow solution in concentrated sulfuric acid. An analogous coloring matter, giving a red solution in concentrated sulfuric acid, can be obtained in the same way from 2.3-diamino-anthraquinone.

Example 4: Mix 10 parts of 1.2-diamino-anthraquinone, from 11 to 14 parts of anthraquinone-2-aldehyde and 200 parts of pyridin, and boil the mixture till no further separation of crystals of the condensation product can be observed. After filtering off the paste of crystals, wash with alcohol. The coloring matter is obtained directly in a pure condition. It yields a greenish yellow solution in concentrated sulfuric acid and dyes cotton from an alkaline hydrosulfite vat giving violet shades. If, in this example, the 1.2-diamino-anthraquinone be replaced by the isomeric 2.3-diamino-anthraquinone, a coloring matter is obtained which dyes cotton shades of orange color and yields a yellow solution in concentrated sulfuric acid. Other solvents can be employed instead of pyridin, for instance naphthalene and nitrobenzene, but then care must be taken that the temperature does not rise above about from 115° to 120° C., as at higher temperature the coloring matter described in the foregoing Example 3 is formed. Cotton which has been dyed violet shades by means of the coloring matter obtainable to this example turns yellow when boiled with nitrobenzene.

Example 5: Mix 10 parts of 1.2-diamino-anthraquinone, 20 parts of omega-dichlor-2-methyl-anthraquinone and 200 parts of pyridin, and boil the mixture for some time in a vessel provided with an inverted condenser. A coloring matter similar in shade to the violet coloring matter described in Example 4 separates out. If, instead of 1.2-diamino-anthraquinone, in this example, the isomeric 2.3-diamino-anthraquinone be treated in accordance with this example, a product is obtained which dyes cotton, from a hydrosulfite vat, yellow shades, and which gives a red solution in concentrated sulfuric acid.

Now what I claim is:—

1. The process of producing coloring matters of the anthraquinone series by condensing an omega-dihalogen-2-methyl-anthraquinone body with an ortho-diamino-anthraquinone.

2. The process of producing coloring matter of the anthraquinone series by condensing 1.2-diamino-anthraquinone with omega-dichlor-2-methyl-anthraquinone.

3. The process of producing coloring matter of the anthraquinone series by condensing 1.2-diamino-anthraquinone with omega-dichlor-2-methyl-anthraquinone in the presence of boiling nitrobenzene.

4. The new vat coloring matters of the anthraquinone series which are condensation products of an omega-dihalogen-2-methyl-anthraquinone body with an ortho-diamino-anthraquinone, which new coloring matters are insoluble in water and in dilute acids and alkalis and yield from yellow to red solutions in sulfuric acid, from yellow-red to brown-red vats with alkaline hydrosulfite, and dye cotton from such vats yellow to orange to violet shades.

5. The new vat coloring matter of the anthraquinone series which is a condensation product of 1.2-diamino-anthraquinone with omega-dichlor-2-methyl-anthraquinone, which new coloring matter is insoluble in water and in dilute acids and alkalis, is infusible below 330° C., gives a yellow-orange solution in concentrated sulfuric acid, a yellow-red vat with alkaline hydrosulfite solution, and dyes cotton clear yellow shades.

In testimony whereof I have hereunto set my hand in the presence of two subscribing witnesses.

MAX HENRY ISLER.

Witnesses:
 ERNEST F. EHRHARDT,
 JOSEPH PFEIFFER.